United States Patent [19]

Takayama

[11] Patent Number: 4,871,215
[45] Date of Patent: Oct. 3, 1989

[54] VEHICLE BRAKING SYSTEM

[75] Inventor: Toshio Takayama, Kanagawa, Japan

[73] Assignee: Tokico Ltd., Japan

[21] Appl. No.: 198,609

[22] Filed: May 11, 1988

Related U.S. Application Data

[60] Continuation of Ser. No. 21,614, Mar. 2, 1987, abandoned, which is a division of Ser. No. 767,511, Aug. 20, 1985, abandoned.

[30] Foreign Application Priority Data

Aug. 20, 1984 [JP] Japan ................................. 59-172773
Aug. 20, 1984 [JP] Japan ........................... 59-126122[U]
Oct. 19, 1984 [JP] Japan ........................... 59-158155[U]

[51] Int. Cl.$^4$ ............................................. B60K 29/02
[52] U.S. Cl. ...................................... 303/100; 303/114; 188/356; 192/4 C
[58] Field of Search ................ 303/114, 100, 52, 119, 303/13, 95, 96; 60/545, 547.1; 91/376 A; 192/3 H, 3 TR, 4 C, 1.28, 1.32, 1.33, 1.35; 180/170, 175, 176, 178, 177, 181 C; 188/356, 357, 355

[56] References Cited

U.S. PATENT DOCUMENTS

| | | | |
|---|---|---|---|
| 2,910,156 | 1/1958 | Apple | 192/3 TR |
| 2,978,080 | 4/1961 | Beatty | 188/357 |
| 3,362,298 | 1/1968 | Julow | 60/547.1 |
| 3,871,497 | 3/1975 | Bessiere | 60/545 |

FOREIGN PATENT DOCUMENTS

| | | | |
|---|---|---|---|
| 21666 | 11/1961 | Japan . | |
| 20334 | 9/1969 | Japan . | |
| 89445 | 5/1983 | Japan . | |
| 0188746 | 11/1983 | Japan | 303/114 |
| 31554 | 2/1984 | Japan . | |
| 143748 | 8/1984 | Japan . | |

Primary Examiner—David K. Moore
Assistant Examiner—Alvin Oberley
Attorney, Agent, or Firm—Wenderoth, Lind & Ponack

[57] ABSTRACT

A vehicle braking system having a servo booster connected to a brake pedal of a vehicle, a hydraulic braking system having a master cylinder which is connected to the servo booster, a booster control device for generating an output force on the servo booster independently of the actuation of the brake pedal, at least one detector for detecting at least one parameter which changes in response to the operating conditions of the vehicle, and a control circuit connected to the detector and controlling the booster control device.

4 Claims, 6 Drawing Sheets

VEHICLE BRAKING SYSTEM

This application is a continuation of now abandoned application Ser. No. 07/021,614 filed Mar. 2, 1987 which is a division of now abandoned application Ser. No. 767,511 filed Aug. 20, 1985.

BACKGROUND OF THE INVENTION

The present invention relates to a vehicle braking system which can produce a braking force automatically under predetermined conditions and, particularly to a vehicle braking system including a servo booster connected to a brake pedal of the vehicle, a hydraulic braking circuit connected to the servo booster, and a booster control device for generating an output force on the servo booster independently of the actuation of the brake pedal.

When the driver of the vehicle wishes to maintain the stopped condition of the vehicle on a sloping road or on a crowded road, it is desirable that the braking force be able to maintained even though the depressing force on the brake pedal is released. One prior art braking system generates a braking force automatically upon detecting that the vehicle speed is nearly zero and that the gas pedal is not depressed and releases the braking force automatically upon detecting that the gas pedal is depressed. Further, such braking system automatically releases the braking force when the transmission lever is shifted to "reverse" position so as to enable the driver of the vehicle to drive the vehicle at a very low speed without depressing the gas pedal while shifting the vehicle rearwards such as driving the vehicle into a garage. However, there is a drawback such that when the braking force has been applied automatically with the vehicle being stopped on a downwardly sloping road, and the driver wishes to rearwardly drive the vehicle and shifts the transmission lever to "reverse" position, the braking force is released automatically and the vehicle moves forward.

Further, it is desirable to control the braking force such that the braking force is automatically reduced in response to the decrease in the speed of the vehicle being braked so as to achieve smooth stoppage of the vehicle and to prevent the so-called swing-back phenomenon accompanying the sudden stoppage of the vehicle. In one prior art braking system, the braking force is decreased to a predetermined low level when the speed of the vehicle being braked is decreased to a predetermined low speed. In another prior art braking system, the braking force is adjusted automatically such that the change in the speed of the vehicle being braked in a predetermined time interval falls within a predetermined range. However, in the former system, since the decreased braking force is constant, the adjustment for achieving optimum braking effect on a level road is not satisfactory on a sloped road and, in the latter system, since the adjusted range in speed change of the vehicle is a constant, the adjustment for minimizing the swing-back phenomenon at the time of stoppage inevitably elongates the braking distance.

Further, in a still further prior art braking system, the braking force which has been applied automatically is released in response to the actuation of a parking brake. However, there is a shortcoming that the automatic braking force is sometimes released too early before a sufficient braking force is achieved by the parking brake whereby the vehicle moves inadvertently.

SUMMARY OF THE INVENTION

One of the objects of the invention is to provide a vehicle braking system which can produce a braking force of a desired level in response to the operating conditions of the vehicle without depressing the brake pedal.

Another object of the invention is to provide a vehicle braking system comprising a servo booster connected to a brake pedal of a vehicle, hydraulic braking means connected to the servo booster, booster control means for generating an output force on the servo booster independently of the actuation of the brake pedal, detecting means for detecting at least one parameter which changes in response to the operating conditions of the vehicle, and control circuit means connected to the detecting means for controlling the booster control means.

According to one feature of the invention there is provided a vehicle braking system comprising a servo booster connected to a brake pedal of a vehicle, hydraulic braking means connected to the servo booster, booster control means for generating an output force on the servo booster independently of the actuation of the brake pedal, a detector detecting the change in the velocity of the vehicle during the actuation of the braking system, setting means for setting the upper and lower limits of the velocity change, means for comparing the detected velocity change with the upper and lower limits and for reducing said output force when the detected velocity change exceeds the upper limit and increasing the output force when the detected velocity change is less than the lower limit, and means for changing the upper and lower limits in response to the velocity of vehicle.

BRIEF DESCRIPTION OF THE DRAWINGS

Further objects and advantages of the invention will now be explained with reference to preferred embodiments of the invention illustrated in accompanying drawings, in which.

Figure 1:
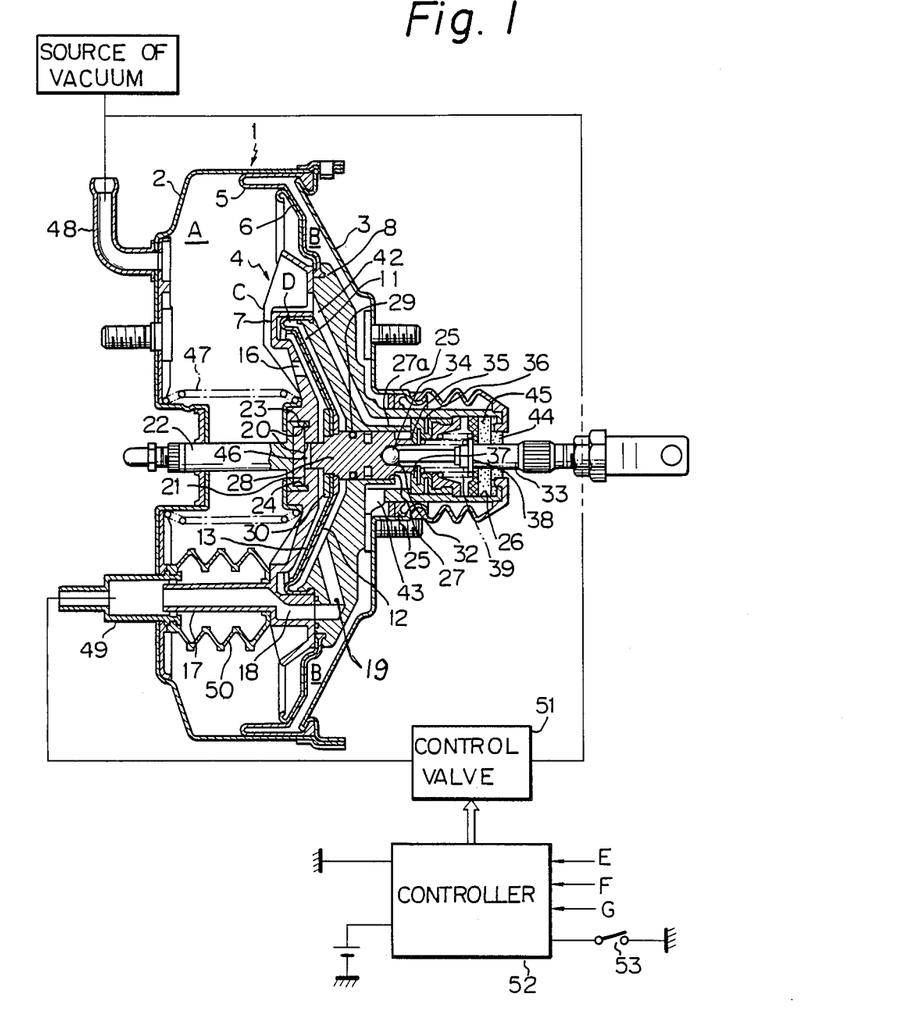
FIG. 1 is a longitudinal sectional view of a pneumatic servo booster of a vehicle braking system according to the invention and a schematic view of a control circuit therefor.

DETAILED DESCRIPTION OF THE PREFERRED EMBODIMENTS:

The servo booster shown in FIG. 1 comprises a main body 1 constituted by a front shell 2 and a rear shell 3, and a power piston 4 displaceably supported in the main body 1 through a flexible diaphragm 5 the outer circumference of which being clamped between the front and rear shells 2 and 3. A first constant pressure chamber A is defined on the front side (left side in the drawing) of the power piston 4, and a first operating pressure chamber B is defined on the rear side (right side in FIG. 1) of the power piston 4 and in the main body 1. The power piston 4 includes a piston plate 6 secured to the diaphragm 5, a piston holder 7 constituting a frontward portion of the power piston 4, and a valve body 8 constituting a rearward portion of the power piston 4. A control chamber 11 is formed between the piston holder 7 and the valve body 8 and in the power piston 4. A control piston 13 is frontwardly and rearwardly displaceably supported in the control chamber 11 by a flexible diaphragm 12, the outer circumferential portion of which is clamped between the piston holder 7 and the valve body 8. A second constant pressure chamber C and a second operating pressure chamber D are defined in the control chamber 11 and by the diaphragm 12 and the control piston 13. The second constant pressure chamber C is permanently communicated with the first constant pressure chamber A through an opening 16 formed in the piston holder 7.

A tubular projection 17 is formed on the front surface of the piston holder 7 to define therein a passage 18 which is permanently communicated with the second operating pressure chamber D through a passage 19 formed in the valve body 8. Further, a central stepped bore 20 is formed in the piston holder 7, with a large diameter portion thereof being formed in the frontward portion receiving therein a flange 23 which constitutes rear-end portion of an output shaft 22. A recess 24 is formed in the rear surface of the flange 23, and a reaction disc 21 formed of resilient material such as rubber is fitted in the recess 24.

The rear end portion of the valve body 8 projects rearward through the rear shell 3, and the valve body 8 is slidably and sealingly supported on the rear shell 3 through a seal member 25. The valve body 8 has a coaxial stepped through bore consisting of a large diameter valve bore portion 26 and a small diameter cylinder bore portion 27.

A plunger 28 having a seal ring 29 in the outer circumference is slidably received in the cylinder bore portion 27. A stepped portion is formed on the front end of the plunger 28 with a reduced diameter portion on the front end thereof being slidably received in the small diameter portion of the stepped bore 20 in the piston holder 7. The inner circumference of the diaphragm 12 and the control piston 13 are secured to a medium diameter portion of the stepped portion of the plunger 28 by a retaining member 30. It will be understood that the medium diameter portion of the plunger 28 projects out of the cylinder bore portion 27. There is provided a small clearance 46 between the forward end of the plunger 28 and the rear surface of the reaction disc 21 normally or in the non-actuated condition of the servo booster.

A recess 32 is formed in the rear end of the plunger 28, and a ball end 34 of an input shaft 33 is rotatably received in the recess 32. The rear end of the input shaft 33 is connected to a brake pedal of the vehicle (not shown). When the brake pedal is depressed the input shaft 33 is displaced forward together with the plunger 28. An annular valve seat 36 is formed on the rear end of the plunger 28 to cooperate with a poppet valve 37, which also cooperates with an annular valve seat 35. The annular valve seat 35 is formed on a shoulder defined on a step between the cylinder bore portion 27 and the valve bore portion 26. The poppet valve 37 has a generally annular configuration with the rear end portion thereof being retained on the inner surface of the valve bore portion 26 and a generally flat annular front surface thereof cooperates with the valve seats 35 and 36.

When the input shaft 33 displaced forward (leftward in FIG. 1) by depressing the brake pedal from the condition shown in FIG. 1, the plunger 28 displaces forward and the valve seat 36 separates from the poppet valve 37 and the atmospheric air enters into the first operating pressure chamber B through an annular opening formed in the rear end of the valve body 8 and around the input shaft 33, an air cleaner 44, a silencer 45, and the inner space of the valve bore portion 26, a clearance between the poppet valve 37 and the valve seat 36, and a passage 43 formed in the valve body 8.

When the input shaft 33 is displaced rearward from the condition of FIG. 1, the engagement between the poppet valve 37 and the valve seat 36 is maintained, while the poppet valve 37 separates from the valve seat 35 on the valve body 8, whereby the first operating pressure chamber B is communicated with the first constant pressure chamber A through the passage 43, the clearance between the poppet valve 37 and the valve seat 35 and a passage 42 in the valve body 8.

A connecting port 48 is provided on the front shell 2 to communicate the first constant pressure chamber A with a source of vacuum pressure such as an intake manifold of an engine of the vehicle. Further, a connecting port 49 is also provided on the front shell 2 to communicate with the passage 18. The connecting port 48 and the passage 18 are separated from the first constant pressure chamber A through an extensible tubular or bellows like seal member 50.

The operation of the servo booster itself shown in FIG. 1 is similar to usual servo booster and will now be explained briefly.

When the brake pedal is depressed, the input shaft 33 displaced forward and atmospheric air is introduced into chamber B to generate a differential pressure between chambers B and A which is transmitted to the output shaft 22 through the power piston 4 and the reaction disc 21. A reaction force is transmitted to the brake pedal through the reaction disc 21, the plunger 28 and the input shaft 33. The servo booster takes an equilibrium condition at which the power piston 4 takes an advanced position, the poppet valve 37 engages with the valve seats 35 and 36 so that the chamber B is separated both from the chamber A and the atmosphere, and a predetermined ratio is established between the output force of the servo booster and the input force applied on the brake pedal.

When the input force on the brake pedal is released, the poppet valve 37 separates from the valve seat 35 on the valve body 8 to communicate the chamber B with the chamber A, and the power piston 4 returns to its non-actuated position by a return spring 47.

Independently of the actuation of the brake pedal, the servo booster can generate an output force by connecting the connecting port 49 with the atmosphere. The atmospheric air introduced through the port 49 enters into the chamber D and generates a differential pressure between chambers D and C, which is transmitted to the output shaft 22 through the reaction disc 21. The plunger 28 advances, thus, the valve seat 36 on the rear end of the plunger 28 separates from the poppet valve 37 whereby the atmospheric air enters into the first operating pressure chamber B and a differential pressure is generated between chambers A and B. The booster generates the maximum output force and no equilibrium condition is attained. When the connecting port 49 is connected to the source of vacuum pressure, the booster returns to the non-actuated condition.

The connecting port 49 is connected to a control valve 51.

The control valve 51 is controlled by a controller 52 to communicate the connecting port 49 with the source of the vacuum pressure or with the atmospheric pressure, whereby the pressure in the second operating pressure chamber D is controlled as desired.

The controller 52 shown in FIG. 1 receives input signals such as vehicle speed signal E, gas pedal condition signal F and vehicle weight signal G, and is connected with a parking brake switch 53 which is 'OFF' in the non-actuated condition of a parking brake, and 'ON' when the parking brake is actuated.

The operation of the first embodiment will now be explained with reference to the flow chart shown in FIG. 3.

Figure 3:
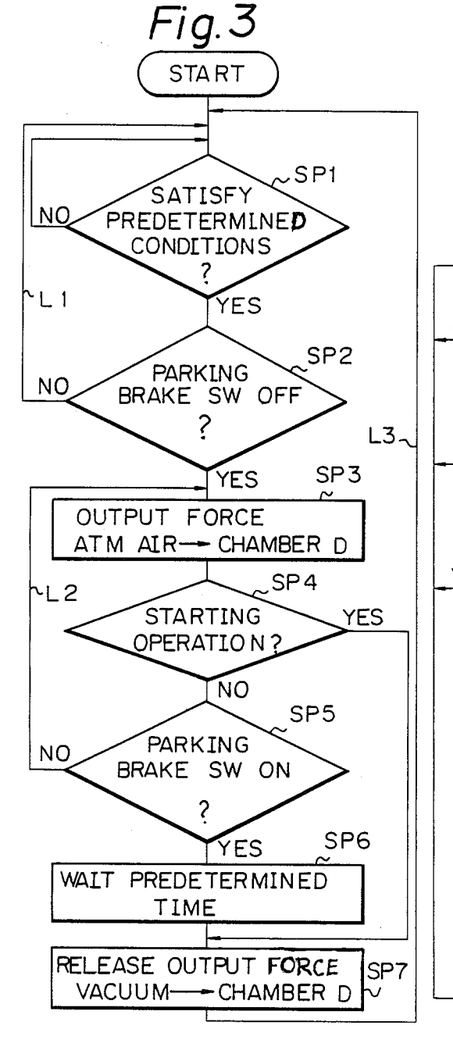
FIG. 3 is a flow chart showing the operation of the embodiment of FIG. 1.

At step $SP_1$ in FIG. 3, assuming that predetermined conditions for stopping the vehicle such as the vehicle speed is less than 6 km/h and the gas pedal is released, are satisfied, then the controller 50 checks whether a parking brake switch is OFF or not (step $SP_2$). When the switch is ON, the steps $SP_1$ and $SP_2$ are repeated along a loop $L_1$. When the switch is OFF, the control valve 51 is actuated to supply atmospheric air into the operating pressure chamber D and the braking action is performed by the output force of the servo booster. The vehicle steps and the braking force is maintained even after the stoppage of the vehicle (step $SP_3$). At steps $SP_4$ and $SP_5$, the controller 52 detects the operation taken by the driver of the vehicle i.e., when the driver carries out a starting operation by depressing the gas pedal ($SP_4$) the braking force is released at step $SP_7$ which will be explained hereinafter, and when the driver applies the parking brake ($SP_5$) which is detected by a parking brake switch, the controller 52 measures a predetermined time T (step $SP_6$) and releases the braking force when the predetermined time T has passed ($SP_7$). In releasing the braking force the controller 52 controls the control valve 51 to communicate the port 49 with the source of vacuum pressure whereby the atmospheric air introduced into the operating pressure chamber D is evacuated. The control piston 13 and the plunger 28 displace rearwards, and the valve seat 36 engages with the poppet valve 37 while the valve seat 35 separates from the poppet valve 37 so that the operating pressure chamber B is communicated with the chamber A through passages 43 and 42 until the power piston 4 returns to the initial position shown in FIG. 1. When the braking force is released the controller 52 returns to the initial condition along a loop $L_3$ and waits the following operation of the driver.

According to the embodiment, the braking force applied by the automatic braking mechanism is released when the parking brake is applied and a predetermined time interval which is usually 1 to 3 seconds has passed, thus the driver can easily determine whether the braking force of the parking brake is sufficient or not, thus, can easily increase the braking force if necessary.

Figure 4:
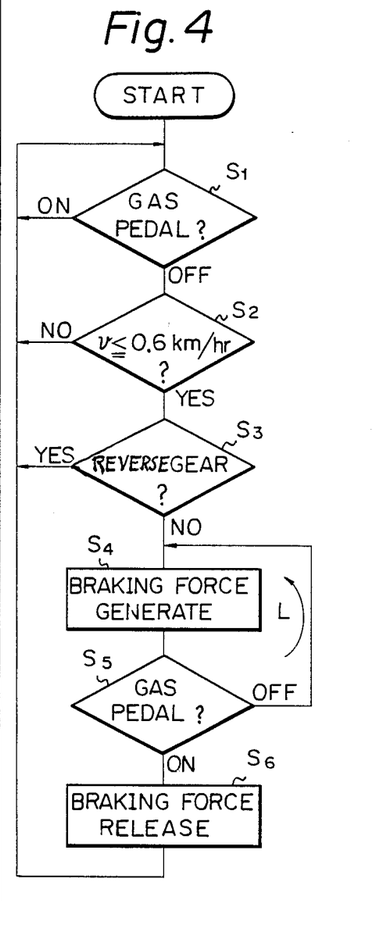
FIG. 4 is a flow chart showing the operation of a modified form of FIG. 1.

FIG. 4 shows a flow chart according to second embodiment of the invention. The controller 52 decides at steps $S_1$, $S_2$ and $S_3$ whether a predetermined brake force applying condition for stopping the vehicle automatically is satisfied or not. When the gas pedal is depressed, the gas pedal switch 53 is ON and the controller 52 repeats the step $S_1$. When the gas pedal is released the switch 53 turns to OFF to start the step $S_2$. The vehicle velocity signal E is supplied to the controller 52 which decides whether the vehicle speed $v \geq 0.6$ km/hr or not at step $S_2$. When the vehicle speed v exceeds 0.6 km/hr, the steps $S_1$ and $S_2$ are repeated and, when the vehicle speed is not larger than 0.6 km/hr, the program goes to step $S_3$. At step $S_3$, the controller 52 determines from the transmission gear condition signal G whether the transmission gear lever is shifted to REVERSE gear position or not. When the transmission lever is shifted to REVERSE position steps $S_1$-$S_3$ are repeated, while, when the lever is not shifted to REVERSE position, then, required condition for automatically stopping the vehicle is satisfied. The braking force is applied at step $S_4$ by connecting the passage 49 with the atmosphere. The actuation of the servo booster according to the second embodiment is similar to the first embodiment. At step $S_5$, the controller 52 decides whether the gas pedal is depressed or not, and when the gas pedal is maintained in the released condition the step $S_4$ is repeated along loop L. Namely, in the stopped condition of the vehicle, the loop L consisting of the steps $S_4$ and $S_5$ is repeated. When the driver of the vehicle depresses the gas pedal for starting the vehicle, the gas pedal switch 53 turns to ON, and the braking force is released at step $S_6$ (by connecting the passage 19 with the source of vacuum pressure). The program returns to step $S_1$.

Thus, according to the second embodiment of the invention, it is possible to release the braking force for rearwardly driving the vehicle at a very low speed in shifting the vehicle sidewise or in driving the vehicle into the garage. Further, when the braking force is applied automatically, the braking force is not released on shifting the transmission gear to the REVERSE position, so that it is possible to prevent the vehicle from incidental movement accompanied by the gear shift when the vehicle is stopped on a sloped road.

Incidentally, the sidewise shifting and the like is usually performed at a low speed and, accordingly, there may be added the condition that the transmission gear is not shifted to LOW or SECOND position for maintaining the braking force.

According to the second embodiment, the automatic braking force is not applied when the transmission gear is shifted to predetermined position(s), and the braking force is not released when the transmission gear is shifted to predetermined position(s), so that it is possible to maintain conventional function that the braking force is not applied in sidewisely shifting the vehicle or in driving into the garage, while adding a novel function to maintain the braking force in spite of the actuation of the transmission gear.

Figure 2:
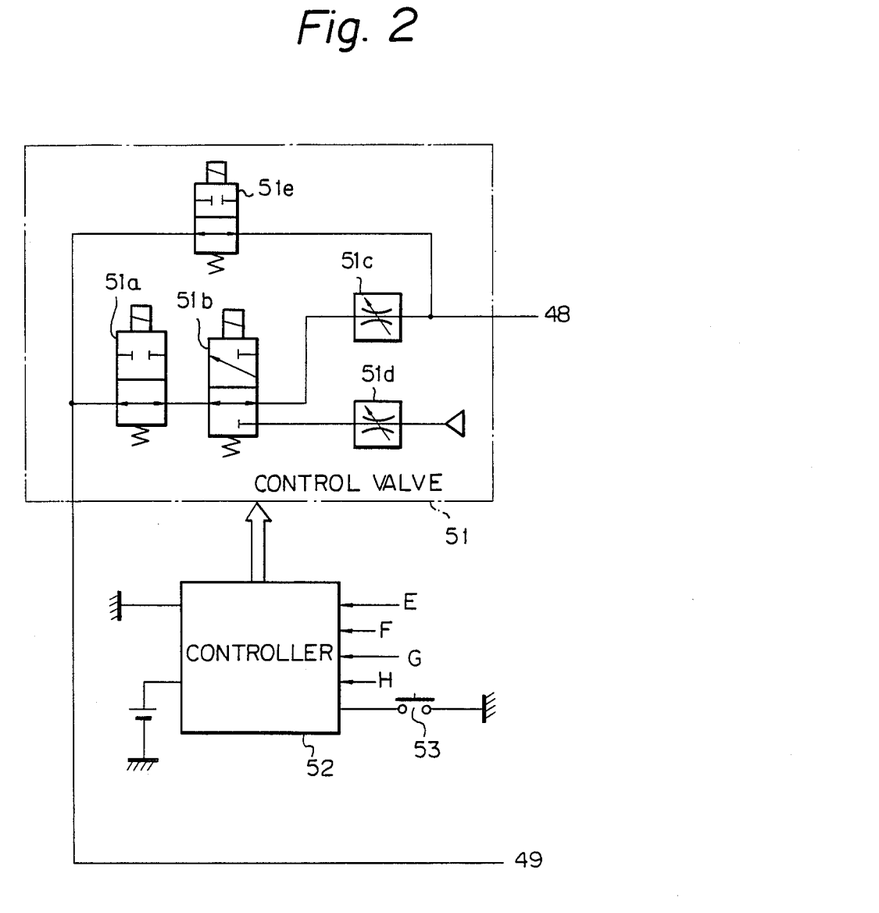
FIG. 2 is a schematic view of a control circuit for controlling the servo booster of FIG. 1 according to another embodiment of the invention.

FIG. 2 shows a third embodiment of the invention showing a modified form of control valve 51 and controller 52 of FIG. 1. The control valve shown in FIG. 2 comprises electromagnetic valves 51a, 51b and 51e, and throttle valves 51c and 51d. The connecting port 48 is connected to the source of vacuum pressure, and the connecting port 49 is connected to the port 48 or to the vacuum pressure through electromagnetic valve 51e or through electromagnetic valves 51a and 51b and the throttle valve 51c or connected to the atmosphere through electromagnetic valves 51a and 51b and the throttle valve 51d. The valves 51a, 51b and 51e are shown respectively in the OFF positions in FIG. 2.

When the electromagnetic valve 51a is in the OFF position and valves 51b and 51e are in the ON positions respectively, atmospheric air is supplied to the second operating pressure chamber D through throttle valve 51d, electromagnetic valves 51b and 51a and connecting port 49, so that the control piston 13 is pressed forward. When the control piston 13 together with the plunger 28 moves forward, the poppet valve 37 separates from the valve seat 36 on the plunger 28, and atmospheric air enters into the chamber B and the output force of the servo booster increases. It will be understood that the control piston 13 acts mainly against the reaction force of the output shaft 22. Thereafter, electromagnetic valves 51a and 51b are moved to the OFF positions and the electromagnetic valve 51e is moved to the ON position, the air in the chamber D flows through connecting port 49, electromagnetic valves 51a and 51b and the throttle valve 51c into the source of vacuum pressure, whereby the control piston 13 together with the plunger 28 displaces rearwards. The poppet valve 37 separates from the valve seat 35 and the chamber B is communicated with chamber A whereby the output force of the servo booster decreases.

When electromagnetic valves 51a, 51b and 51e are moved to the OFF positions (as shown in FIG. 2), the operating pressure chamber D is connected to the source of vacuum pressure with the minimum resistance, and the decrease or release of the braking force is performed rapidly. Incidentally, it is assumed that no depressing force is applied on the brake pedal.

When electromagnetic valves 51a and 51e are moved to the ON positions and electromagnetic valve 51b is moved to the OFF position, then, connecting port 49 is closed by electromagnetic valves 51a and 51e, and a certain braking force is maintained. The aforesaid relationships are shown in Table 1.

TABLE 1

| Valve 51a | Valve 51b | Valve 51e | Braking force |
|---|---|---|---|
| OFF | ON | ON | Increase |
| OFF | OFF | ON | Decrease |
| ON | OFF | ON | Maintain |
| OFF | OFF | OFF | Release |

The controller 52 receives input signals such as vehicle speed signal E, gas pedal condition signal F, manual brake operating signal G, vehicle weight signal H and the like from suitable detectors (not shown), and a manual switch 53 for starting an automatic braking operation is connected to the controller 52. The manual switch 53 is preferably an automatic return type or non-lock type wherein the switch returns automatically to the initial position upon release of the actuating force applied to the switch and the controller receives a signal that the switch is actuated.

Figure 5A:
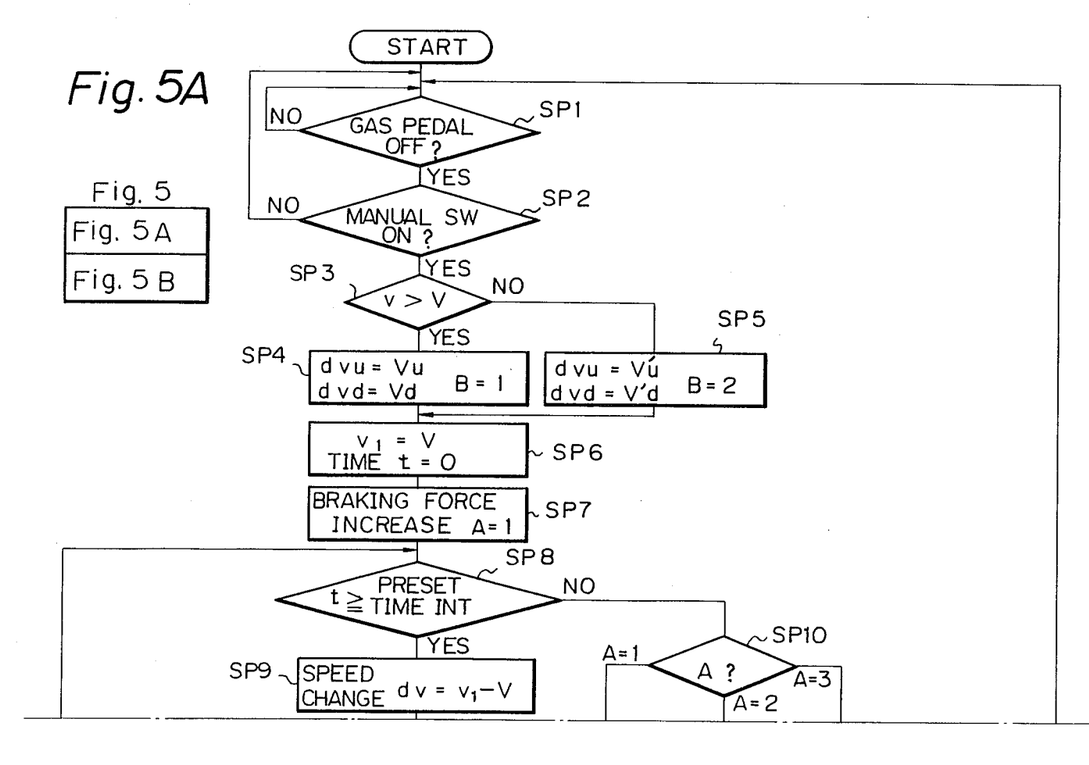
FIG. 5(a) and (b) are a flow chart showing the operation of the embodiment of FIG. 2.
Figure 5B:
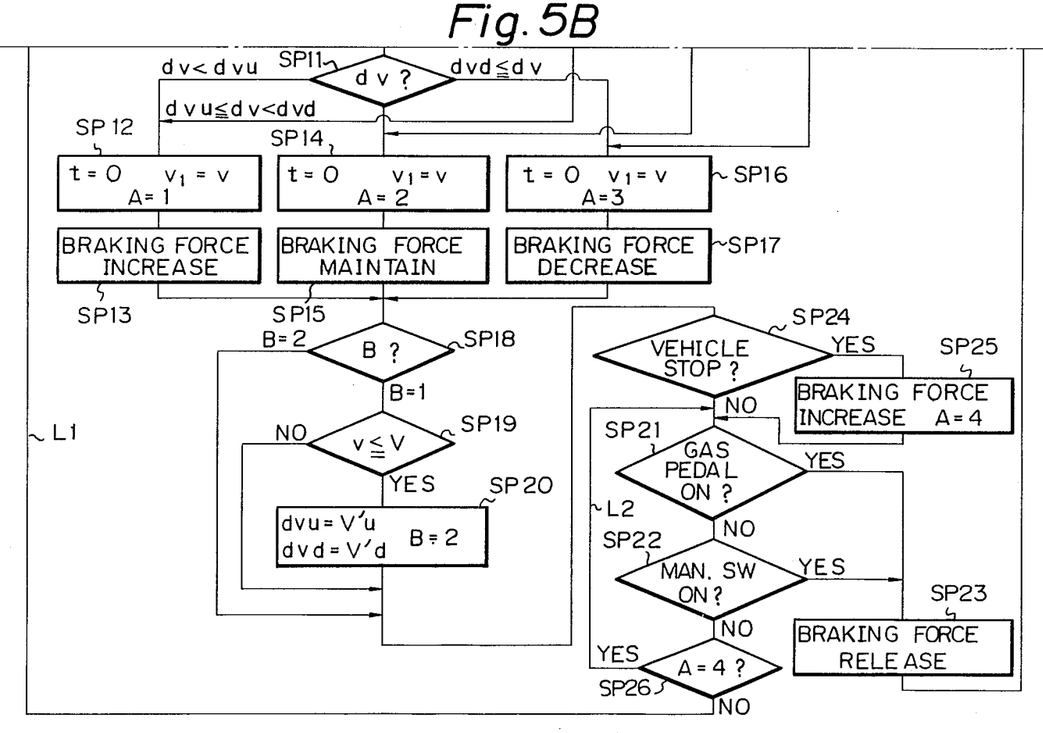

The operation of the third embodiment will now be explained with reference to the flow chart shown in FIG. 5 and the time chart of FIG. 6.

Initial Setting (SP$_1$ –SP$_7$)

Figure 6:
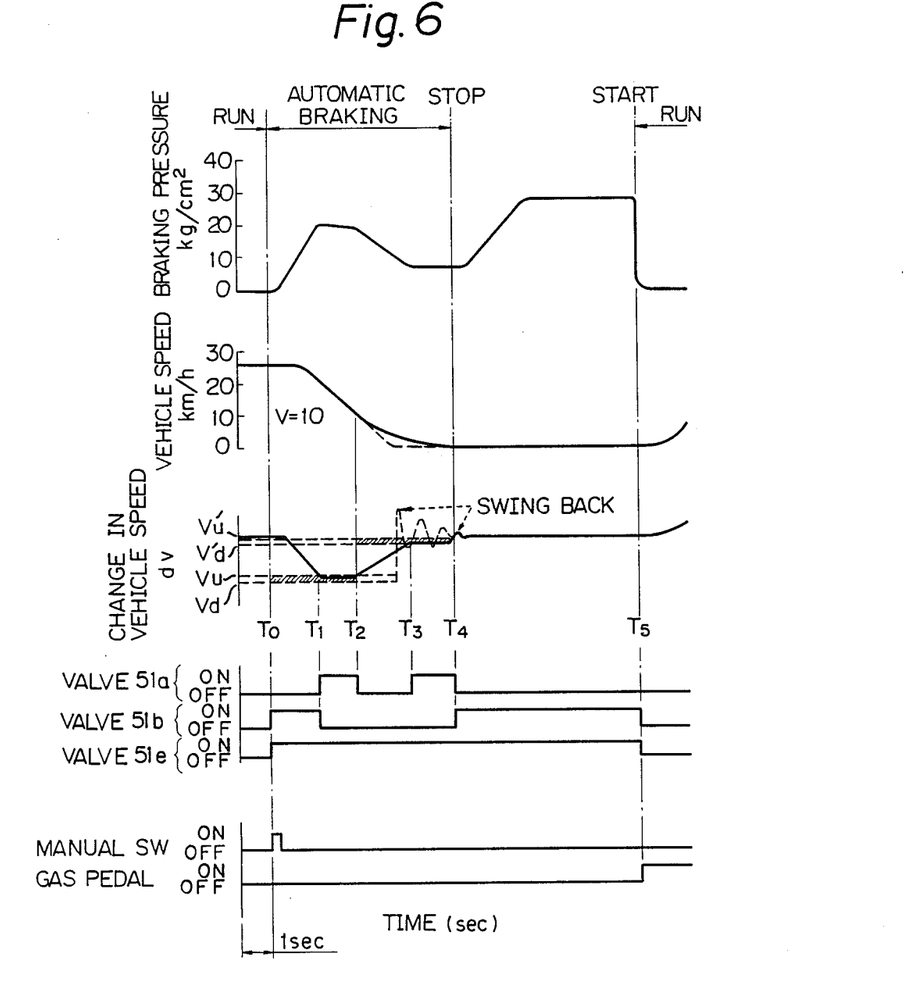
FIG. 6 is a graph showing the operation of the embodiment of FIG. 2.

The driver of the vehicle releases the gas pedal (SP$_1$), and actuates the manual switch 53 (step SP$_2$) at time T$_0$ in FIG. 6. The controller 52 receives these signals and compares the vehicle speed S at the instant with a predetermined speed V (V =10 km/hr in FIG. 6) (step SP$_3$). When v >V, larger threshold values V$_u$, V$_d$ (V$_u$ <V$_d$) are set as threshold values dv$_u$, dv$_d$ of the change in the vehicle velocity (step SP$_4$), while, when v ≦V, smaller threshold values V'$_u$, V'$_d$ (V'$_u$ <V'$_d$, V'$_u$ <V$_u$ and V'$_d$ <V$_d$) are set as threshold values of the change in the vehicle velocity (step SP$_5$). In the former, set flag B as "1" and, in the latter, set B =2 respectively. At step SP$_6$, the time t of the detection of the change in the vehicle speed is set as t =0, and the velocity V at this condition is set as V =V$_1$, thereafter, at step SP$_7$, set flat A as A =1 and the braking force is applied by actuating the electromagnetic valves 51a and 51b to OFF and ON respectively. The atmospheric air is introduced into the operating pressure chamber D through throttle valve 51d and electromagnetic valves 51b and 51a, with the control piston 13 and the plunger 28 displacing forward so that the valve seat 36 separates from the poppet valve 37 and the atmospheric air flows into the operating pressure chamber B. The control piston 13 counteracts the reaction force of the output shaft 22, thus, by controlling the open/close time of electromagnetic valves 51a and 51b, it is possible to adjust the pressure in the operating pressure chamber D thereby controlling the braking force. The decrease of the vehicle speed is started from time T$_0$ in FIG. 6.

Detection of Vehicle Speed Change dV and Adjustment of Braking Force (SP$_8$ –SP$_{17}$)

At steps SP$_8$ –SP$_{17}$, the vehicle speed change dV is detected at predetermined time intervals, and the braking force is adjusted based on the detection.

At step SP$_8$, when a predetermined time interval t for detecting the vehicle speed change has elapsed, the vehicle speed change dV is detected (dV =initial speed V$_1$ −instant speed V), and controlling is performed according to steps SP$_9$ and SP$_{11}$ based on the dV. (a) dV <dV$_u$ In this case, the speed change dV is so small that the braking force is increased by actuating electromagnetic valves 51a and 51b to OFF and ON respectively (step SP$_{13}$). Incidentally, prior to this step, the time for detecting the vehicle speed change is cleared (t=0), speed V is set as initial speed V$_1$, and the increase in the braking force is indicated (flag A=1) as shown in step SP$_{12}$.

This condition continues until time T$_1$ whereat the vehicle speed change dV exceeds dV$_u$ (=V$_u$) in FIG. 6. (b) dV$_u$ ≦dV <dV$_d$ The vehicle speed change dV is within the predetermined range, the braking force is maintained with electromagnetic valves 51a and 51b being ON and OFF respectively as shown in step SP$_{15}$. Incidentally, prior to this step, the time for detecting the vehicle speed change is cleared (t=0), speed V is set as initial speed V$_1$, and the maintaining of the braking force is indicated (Flag A=2) ;as shown in step SP$_{14}$.

In FIG. 6, this condition is maintained between time T$_1$ and time T$_2$ at time T$_2$ the vehicle speed change decreases below threshold value dV$_u$ (V$_u$), and between time T$_3$ and time T$_4$ where the vehicle speed change is maintained between smaller threshold values V'$_u$ and V'$_d$. (c) dV >dV$_d$ In this case, the vehicle speed change dV is too large, and the electromagnetic valves 51a and 51b are actuated to OFF and OFF respectively thereby decreasing the braking force (step SP$_{17}$). Incidentally, prior to this step, the time for detecting the vehicle speed change is cleared (t =0), speed V is set as initial speed V$_1$, and the decrease in the braking force is indicated (flag A=3) as shown in step SP$_{16}$.

In FIG. 6, this condition is shown between time T$_2$ and time T$_3$.

Incidentally, when the time t detecting the vehicle speed change is shorter than the predetermined time, the flag A is checked at step SP$_{10}$, and according to flag A either of steps 12, 14 and 16 is carried out.

Change in Threshold Value $dV_u$, $dV_d$ (SP$_{20}$)

The threshold values $dV_u$ and $dV_d$ have initially been set to larger ones $V_u$ and $V_d$ respectively (flag B =1), but when the vehicle speed V is decreased below a predetermined speed V (steps SP$_{18}$ and SP$_{19}$), the threshold values are set to lower ones $V'_u$ and $V'_d$ respectively as shown in steps SP$_{20}$ and flag B is set to 2.

In FIG. 6, it is shown at time T$_2$ the vehicle speed V decreases below 10 km/hr and the change in threshold values are effected. Refer to aforesaid item (c).

Release in Braking Force (SP$_{21}$ –SP$_{23}$)

When the gas pedal is depressed, or when the manual switch 53 is pushed again (steps SP$_{21}$ and SP$_{22}$), electromagnetic valves 51a, 51b and 51e are changed to OFF, and the automatic braking force is released as shown in step SP$_{23}$. The operating pressure chamber D is communicated with the source of vacuum pressure and the control piston 13 and the plunger 28 displace rearwards. The valve seat 35 separates from the poppet valve 37, and the chamber B is communicated with chamber A through passages 42 and 43. When the gas pedal is not actuated and the manual switch 53 is not actuated again, the controller 52 performs a routine L$_1$ consisting of steps SP$_8$ –SP$_{22}$ and detects the change in the vehicle velocity and aforesaid process is performed in accordance therewith.

After Stoppage of Vehicle (SP$_{24}$ –SP$_{26}$)

When the vehicle stops during the routine L$_1$ as shown in step SP$_{24}$, the braking force is increased to ensure the stoppage of the vehicle and sets the flag A as A =4 (SP$_{25}$), and a routine L$_2$ consisting of steps SP$_{21}$, SP$_{22}$ and SP$_{26}$ to maintain the maximum braking force until aforesaid braking force releasing operation is performed.

This condition is shown in FIG. 6 between time T$_4$ and time T$_5$, and at time T$_5$ the braking force is released by depressing the gas pedal.

According to the third embodiment of the invention, the threshold values $dV_u$ and $dV_d$ are changed at time T$_2$ or when the vehicle speed decreases to a predetermined speed, so that the decrease in the vehicle speed just before the stoppage of the vehicle is decreased whereby the stoppage of the vehicle can be performed smoothly and, as shown by the solid line in FIG. 6 the swing back of the vehicle just after the stoppage can substantially be decreased as compared with broken lines showing the swing back phenomenon of the prior art. Further, the braking force is adjusted in response to the speed change, so that it is possible to remove the effects of the condition of the road surface.

As described heretofore, according to the invention, the braking force can be applied easily and adjusted automatically in response to predetermined operational conditions of the vehicle, so that it is possible to reduce substantially the load on the driver and to improve the driving safety.

It will be understood that the invention is not limited to the embodiments and various changes or modifications may easily be applied within the gist of the present invention. For example, the servo booster may be of any other type such that the operating pressure is a positive pressure. Further, the control circuit may include a micro-processor.

What is claimed is:

1. A vehicle braking system comprising:
a braking force applying and releasing means;
detecting means for detecting whether the transmission of the vehicle is in reverse position; and
control means to which said detecting means is connected, said control means having a first deciding means for deciding whether a braking force applying condition for a vehicle exists and for supplying a braking force applying signal to said braking force applying and releasing means to apply a braking force when it is determined that said braking force applying condition exists, said braking force applying condition comprising the gas pedal of the vehicle being in a non-depressed condition, the transmission being in a position other than the reverse position and the speed of the vehicle being zero or lower than a predetermined level, and a second deciding means for deciding whether a braking force releasing condition of the vehicle exists and for supplying a braking force releasing signal to said braking force applying and releasing means to release said braking force being applied when it is determined that said braking force releasing condition exists, said braking force releasing condition comprising the gas pedal being in a depressed condition, means for keeping said first deciding means supplying said braking force applying signal to the braking force applying and releasing means even if said detecting means detects that said transmission is shifted to reverse position, while said braking force applying and releasing means is applying a braking force.

2. The vehicle braking system of claim 1, wherein said braking force applying condition comprises the speed of the vehicle being lower than said predetermined level which is greater than zero.

3. A vehicle braking system comprising:
a servo booster connected to the braking pedal of a vehicle;
hydraulic braking means connected to said servo booster;
a braking force applying and releasing means connected to said servo booster for generating an output force on the servo booster independently of the actuation of the brake pedal;
detecting means for detecting whether the transmission of the vehicle is in reverse position; and
control means to which said detecting means is connected, said control means having a first deciding means for deciding whether a braking force applying condition for a vehicle exists and for supplying a braking force applying signal to said braking force applying and releasing means to apply a braking force when it is determined that said braking force applying condition exists, the braking force applying condition comprising the gas pedal of the vehicle being in a non-depressed condition, the transmission being in a position other than the reverse position and the speed of the vehicle being zero or lower than a predetermined level, and a second deciding means for deciding whether a braking force releasing condition of the vehicle exists and for supplying a braking force releasing signal to said braking force applying and releasing means to release said braking force being applied when it is determined that said braking force releasing condition exists, said braking force releasing condition comprising the gas pedal being in a depressed condition, means for keeping said first deciding means supplying the braking force applying signal to the braking force applying and releasing means even if said detecting means detects that said transmission is shifted to said reverse position, even if said detecting means detects that said transmission while said braking force applying and releasing means is applying a braking force.

4. The vehicle braking system of claim 3, wherein said braking force applying condition comprises the speed of the vehicle being lower than said predetermined level which is greater than zero.

* * * * *